US006478458B2

(12) United States Patent
Hickman

(10) Patent No.: US 6,478,458 B2
(45) Date of Patent: Nov. 12, 2002

(54) ILLUMINATED MOTORCYCLE LICENSE PLATE HOUSING

(76) Inventor: Joel E. Hickman, 941 Ramblin Rd., Greenwood, IN (US) 46142

( * ) Notice: Subject to any disclaimer, the term of this patent is extended or adjusted under 35 U.S.C. 154(b) by 0 days.

(21) Appl. No.: 09/778,598

(22) Filed: Feb. 7, 2001

(65) Prior Publication Data
US 2002/0105811 A1 Aug. 8, 2002

(51) Int. Cl.[7] ................................................ B62J 39/00
(52) U.S. Cl. ...................................... 362/473; 362/497
(58) Field of Search ................................ 362/473, 487, 362/497; 40/210, 209

(56) References Cited

U.S. PATENT DOCUMENTS

| | | | |
|---|---|---|---|
| 1,546,321 A | 7/1925 | Smith | |
| 1,887,087 A | 11/1932 | Frizner | |
| 2,526,460 A | 10/1950 | Crocella | 40/130 |
| D163,328 S | 5/1951 | Rothman | D14/6 |
| 2,562,740 A | 7/1951 | Rizer | 40/130 |
| 2,875,539 A | 3/1959 | Gladd | 40/133 |
| 3,187,452 A | 6/1965 | Dotson | 40/202 |
| 4,790,087 A | 12/1988 | Hamada et al. | 40/204 |
| 4,819,355 A | 4/1989 | Solow | 40/209 |
| 4,857,890 A | 8/1989 | Solow | 340/479 |
| 4,924,611 A | * 5/1990 | Shaw | 40/200 |
| D327,915 S | 7/1992 | Anderson et al. | D20/10 |
| 5,339,550 A | * 8/1994 | Hoffman | 362/497 |
| 5,383,294 A | 1/1995 | Shen | 40/209 |
| 5,408,772 A | 4/1995 | Pettyjohn | 40/204 |
| 5,521,799 A | * 5/1996 | VerKamp | 362/225 |
| 5,620,340 A | 4/1997 | Andrews | 439/608 |
| 5,692,327 A | * 12/1997 | Wynne et al. | 362/812 |
| 5,697,175 A | * 12/1997 | Schwartz | 362/800 |
| 5,934,798 A | 8/1999 | Roller et al. | 362/497 |

* cited by examiner

Primary Examiner—Sandra O'Shea
Assistant Examiner—John Amarantides
(74) Attorney, Agent, or Firm—Woodard, Emhardt, Naughton, Moriarty & McNett

(57) ABSTRACT

A motorcycle license plate frame having an illuminated message bar is provided. The message bar has transparent optical apertures in the shape of symbols and/or alphanumeric characters that form a message. The message is illuminated by a light source located behind the message bar and connected to the motorcycle's electrical system. The color of all or portions of the message can be altered with tinted filters placed between the light source and the optical apertures. The message bar is made from a structural material and can be easily removed allowing replacement of the message without the expense and trouble of replacing the entire unit.

20 Claims, 3 Drawing Sheets

ILLUMINATED MOTORCYCLE LICENSE PLATE HOUSING

This invention relates to motorcycles and, more specifically, to a motorcycle license plate housing having an interchangeable illuminated message bar.

BACKGROUND OF THE INVENTION

Typically, a license plate is attached directly to a motor vehicle. Recently, the use of license plate frames to mount license plates to motor vehicles has gained popularity, especially with regards to motorcycles. License plate frames are increasingly popular with motorcycle enthusiasts, both as decorative accessories and as added protection for the license plate. One popular decorative enhancement contributed by some license plate frames is in the form of an illuminated message. While license plate frames including illuminated messages are known in the art (see, for example, U.S. Pat. No. 1,887,087 to Frizner), such frames include the message as an integral part of the frame. However, the entire frame must be replaced in order to change the message. Hence, there is a need for an improved license plate frame capable of displaying any one of a number of illuminatable messages without the waste and expense of having to replace the entire frame each time the message is changed. The present invention is directed toward meeting this need.

SUMMARY OF THE INVENTION

In one aspect, this invention is a system for displaying interchangeable illuminatable messages adjacent a license plate mounted on a motor vehicle. The system includes a license plate holding frame portion and at least one message bar portion adapted to couple to the frame portion. The frame portion also includes a light source and the message bar portion includes a series of optically transparent or translucent characters through which the light source may shine.

In one preferred embodiment, the frame portion is a chromed aluminum member adapted to be attached to a motorcycle and fitted to hold and display a standard motorcycle license plate. This preferred embodiment further includes a slot formed in the frame portion and a string of LED light sources positioned in the slot and electrically connected to the motorcycle's headlight system, such that the LEDs are energized when the motorcycle lights are energized. In this preferred embodiment, a chromed aluminum message bar having a series of alphanumeric or symbol characters cut therethrough is secured in the slot, such that the alphanumeric characters are illuminated when the LEDs are energized.

In some embodiments, a tinted mask is positioned between the LEDs and the characters. In these embodiments, the message is colored by the light from the LEDs filtering through the tinted mask.

In other embodiments, the light source is one or more incandescent bulbs positioned in the slot. In these embodiments, the incandescent bulbs are chosen to be compatible with the voltage parameters of the power source.

In still other embodiments, the frame and message bar portions are formed from plastic. In these embodiments, the frame and message bar portions may be chromed or chrome plated for the appearance of being metallic.

DETAILED DESCRIPTION OF THE PREFERRED EMBODIMENT

Specific language is used in the following description and examples to publicly disclose my invention and to convey its principles to others. No limits on the breadth of my patent rights based simply on using specific language are intended. Any alterations and modifications to this description that should normally occur to one of average skill in creating board games are also included.

Figure 1:
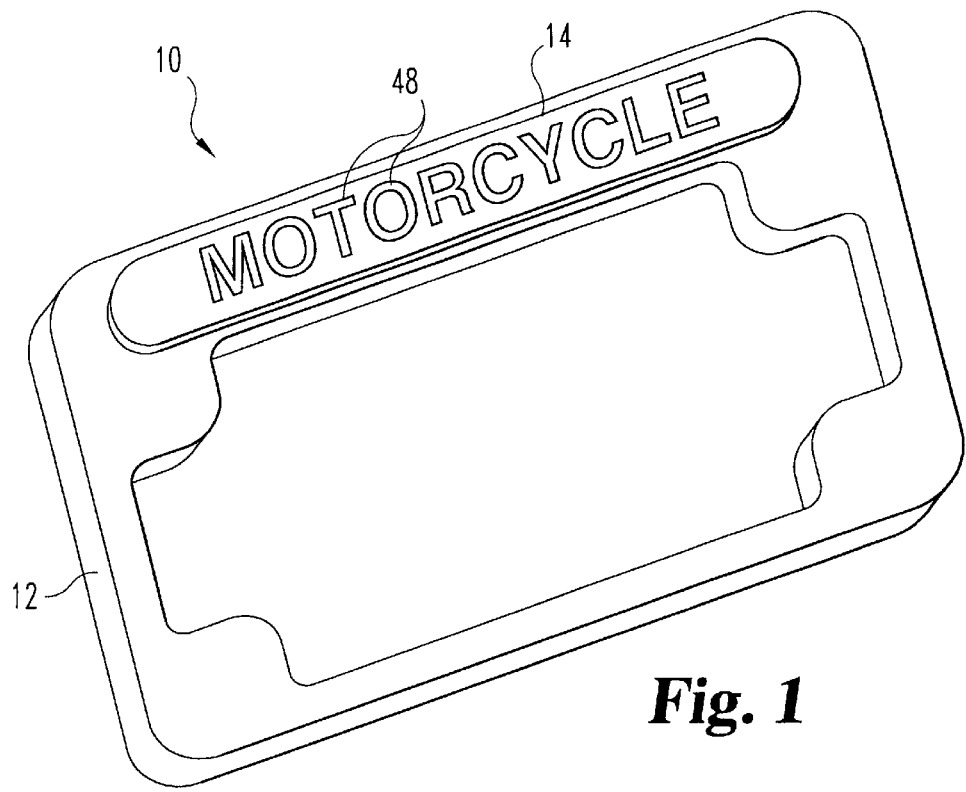
FIG. 1 is a front perspective view of a motorcycle license plate holder embodiment of the present invention.
Figure 2:
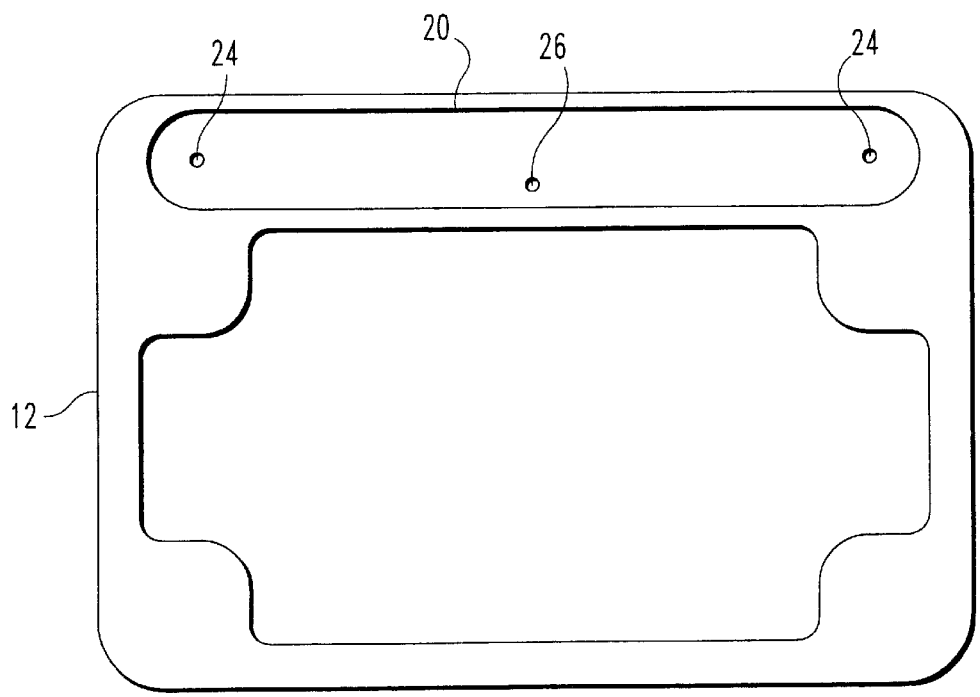
FIG. 2 is a front elevational view of the frame portion of the license plate holder embodiment shown in FIG. 1.

FIGS. 1–7 illustrate a first preferred embodiment license plate holder system 10 of the present invention. As is best illustrated in FIGS. 1 and 2, the license plate holder system 10 consists of a frame portion 12 and an interchangeable elongated message bar portion 14. The frame portion 12 is sized and shaped to connect to a motor vehicle while securing the vehicle's license plate therein. Preferably, the frame portion 12 is adapted to fit a motorcycle or an automobile, although the frame portion 12 may be adapted to fit other motor vehicles, such as trucks and recreational vehicles.

Figure 3:
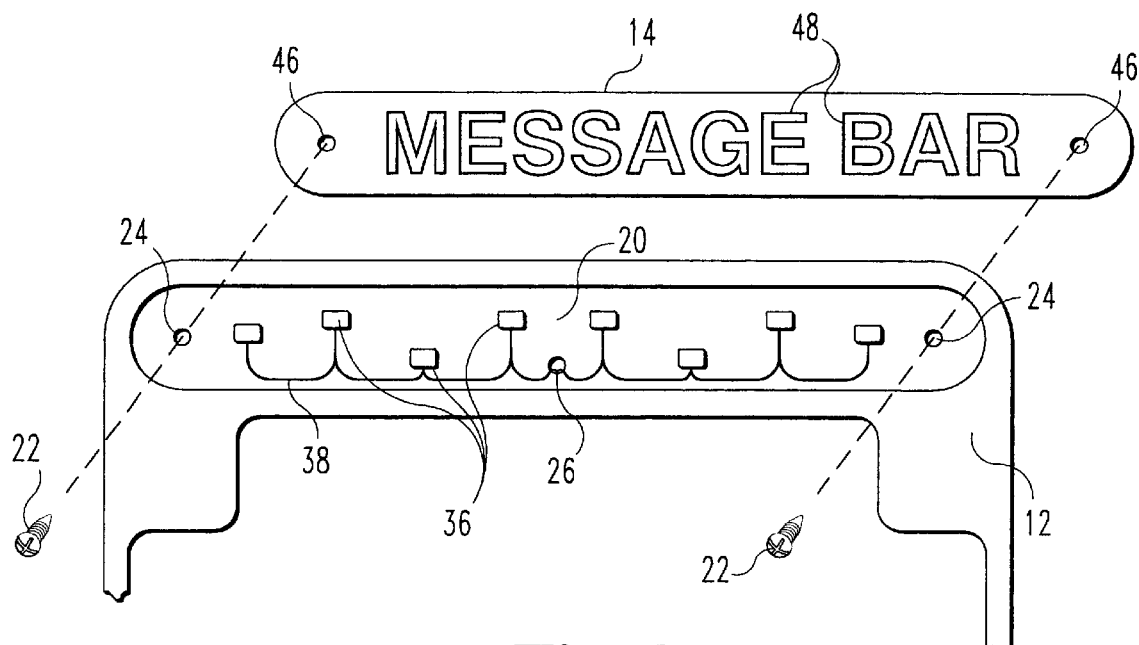
FIG. 3 is an exploded partial perspective view of a message bar and slot of the motorcycle license plate holder embodiment of the present invention shown in FIG. 1.

As can be best viewed in FIGS. 2 and 3, the frame portion 12 includes an elongated recessed slot 20. The slot 20 is sized and shaped to receive the elongated message bar 14 therein. Preferably, the slot 20 has a depth slightly less than the thickness of the message bar 14 and a length and width slightly greater than the respective length and width of the message bar 14, such that when the message bar 14 is inserted into the slot 20 the message bar 14 rests loosely in the slot 20 and a portion of the message bar 14 protrudes from the slot 20. As illustrated in FIG. 3, the message bar 14 has a form suitable for insertion into slot 20 and is preferably secured in the slot 20 by connectors 22, such as screws, extending through connector apertures 24 opening into the slot 20. Electrical connections into the slot 20 may be made through an electrical connector aperture 26.

Figure 4:
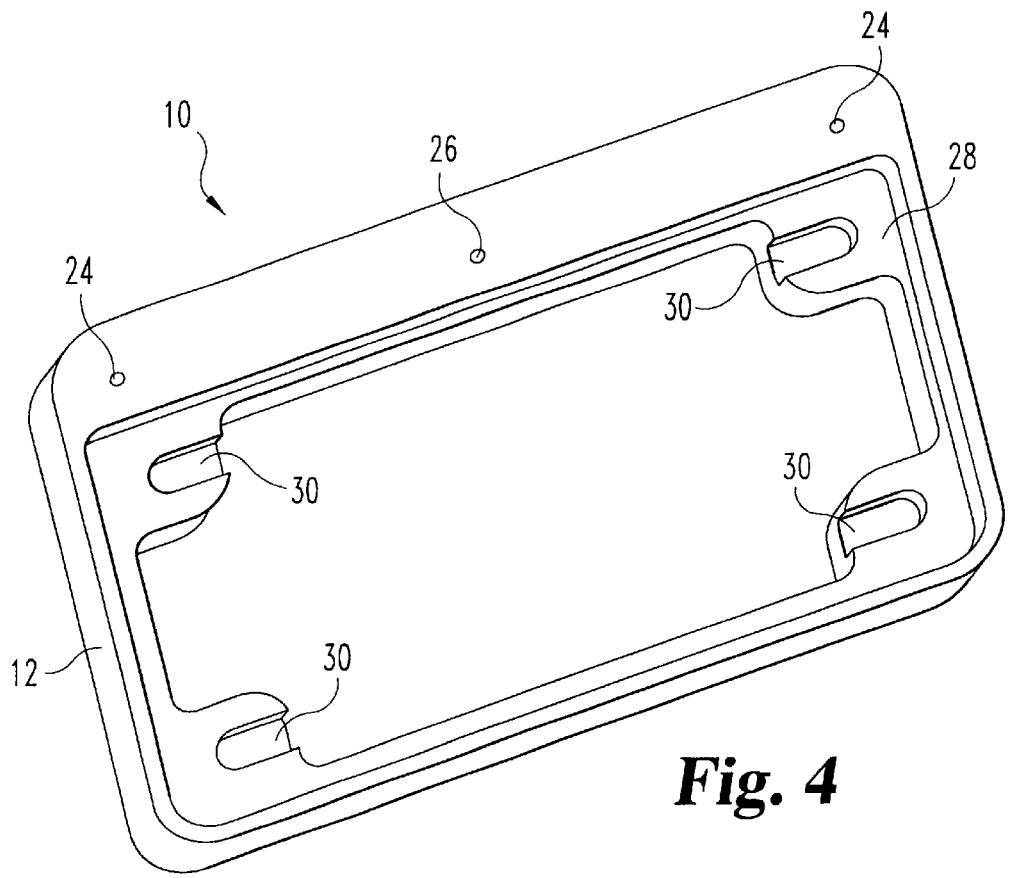
FIG. 4 is a rear perspective view of a motorcycle license plate holder embodiment of FIG. 1.
Figure 5:
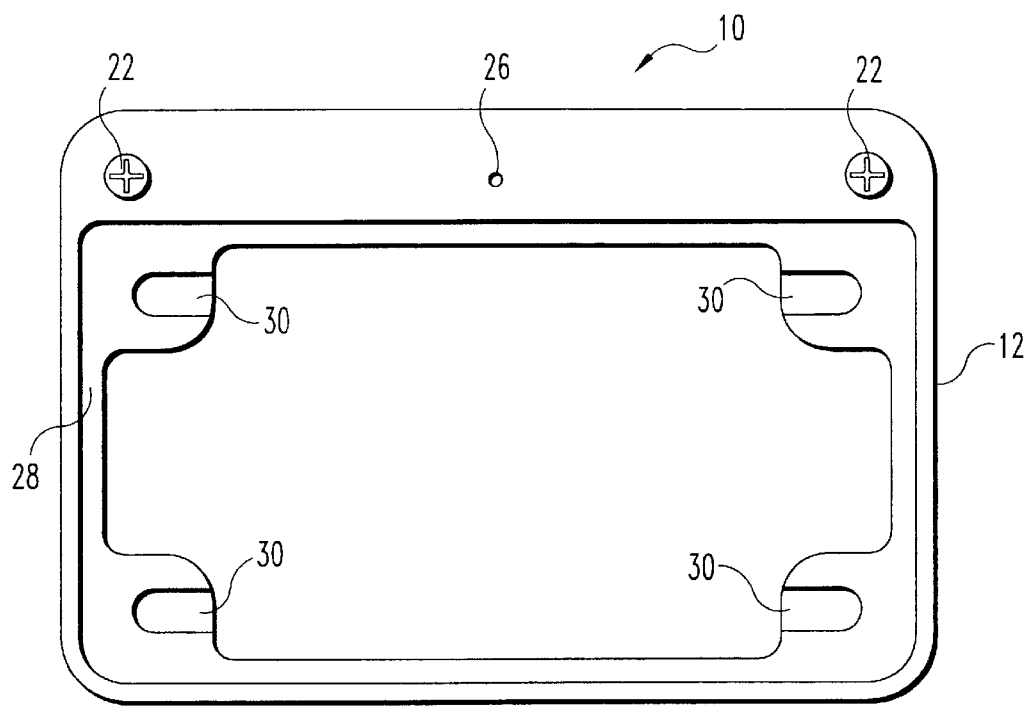
FIG. 5 is a rear elevational view of the embodiment of shown in FIG. 1.

FIGS. 4 and 5 illustrate the rear of the frame portion 12. The frame portion 12 includes a sized and shaped license plate recess 28 adapted to receive a standard vehicular license plate. Preferably, the recess 28 is adapted to receive a motorcycle license plate, but may also be adapted to receive a standard automobile license plate or a license plate of any desired size. The frame portion 12 also includes one or more mounting members such as for example mounting slots 30 for securing the frame portion 12 to a vehicle. Preferably, the mounting slots 30 are adapted to match the standard pattern of license plate connectors common to the vehicle the frame portion 12 is desired to be attached to. More preferably, in the case of a license plate holder 10 intended for use with a motorcycle, the frame portion 12 includes four slots 30 oriented at the corners of a substantially three by six inch rectangle, although the number and orientation of slots 30 may vary as desired.

Referring back to FIG. 3, a light source 36 is electrically connected in the slot 20. The light source 36 is preferably a set of light emitting diodes (LEDs) in electric communication with a power source (such as the vehicle battery or an independent battery, not shown). The light source 36 is more preferably a string of 1.5 volt LEDs. The electrical connection wires 38 provide connectors which extend from the LEDs 36 to the power source through the electrical connection aperture 26. Preferably, the light source 36 is electrically connected to a circuit controlling the light system of the vehicle, such that energization of the vehicle's headlight(s) or running lights likewise actuates energization of the light source 36.

Figure 6:
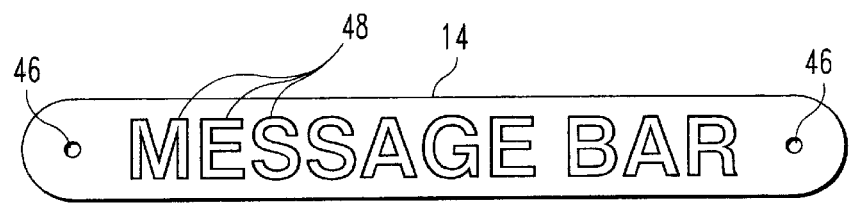
FIG. 6 is a front elevational view of the message bar of FIG. 1.
Figure 7:
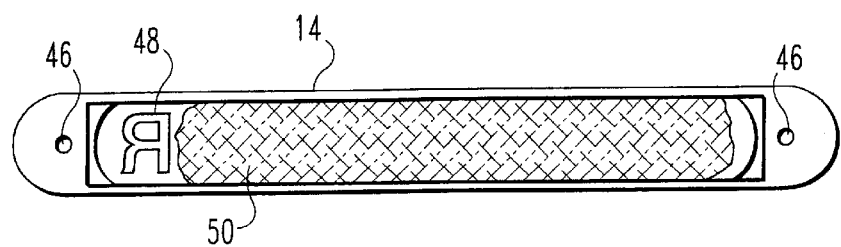
FIG. 7 is a rear elevational view of the message bar of FIG. 1.

FIGS. 6 and 7 illustrate the message bar 14 in detail. The message bar 14 preferably includes one or more threaded apertures 46 positioned to match the connector apertures 24 formed through the slot 20. The message bar 14 is preferably secured in the slot by threaded screws 22 extending through the apertures 24 and threadedly engaging the threaded apertures 46, although any other convenient connection means (such as, for example, an interference fit between the message bar 14 and the slot 20, a flexible gasket fitting, spring loading, or the like) may be selected.

The message bar 14 further includes a series of optically transparent or translucent character apertures 48 formed therethrough in the shape of letters or other symbols. The character apertures 48 are preferably formed as empty windows cut through the message bar 14, although the apertures may be filled with an optically transparent or translucent solid material, such as glass or plastic. In other words, the character apertures 48 are typically cut through the message bar 14 and left as empty holes, such that a fluid could travel freely therethrough.

The message bar 14 may also contain a tint mask 50 overlaying the character apertures 48. The tint mask 50 is preferably a strip of colored optically transparent or translucent (i.e., non-opaque) glass or plastic material positioned on the interior of the message bar 14 and covering all of the character apertures 48, but may likewise be positioned on the exterior of the message bar 14 or positioned to cover only some of the character apertures 48. The tint mask 50 may have a uniform color or may be multicolored, as desired.

In use, the license plate holder system 10 provides both added protection to a license plate and enhanced aesthetic appeal. Also, the illuminated message bar 14 provides extra visibility to other motorists after dark. In practice, a variety of pre-selected message may be provided to the consumer, along with the option of having any desired message custom cut into a message bar 14.

The frame holder system 10 may be formed from any convenient structural materials, such as aluminum, steel, plastic, or wood. The frame portion 12 and message bar portions 14 are preferably metallic, are more preferably substantially formed from aluminum, and are still more preferably from chromed aluminum. The connectors 22 are preferably screws, but may be any convenient connectors. The frame holder system 10 is preferably adapted to be connected to or mounted on a motorcycle, but may also be adapted to be connected to or mounted on any desired vehicle. The character apertures 48 are preferably cut completely through the message bar 14 by a laser or water jet cutting process, but may otherwise be formed by any convenient and commercially advantageous means.

Applicant's novel illuminated license plate holder can be utilized for displaying an illuminated message from a motorcycle, the method comprising the steps of:

a) providing a license plate frame made from a structural material and having an elongated recess formed therein;

b) positioning a light source in the recess;

c) providing at least one elongated substantially opaque message bar made from a structural material having windows formed therein for displaying a predetermined message; and d) removably connecting the at least one elongated message bar in the elongated recess. Once mount and connected to the motorcycle's electrical system, the light source can be energized to illuminate and display the message.

While the invention has been illustrated and described in detail in the drawings and foregoing description, the same is to be considered as illustrative and not restrictive in character, it being understood that only the preferred embodiment has been shown and described in detail and that all changes and modifications that come within the spirit of the invention are desired to be protected.

I claim:

1. A license plate frame, comprising:
a frame made from a structural material;
a slot formed in the frame;
a light source operationally connected within the slot; and
at least one message bar, having a form adapted to fit into the slot;
wherein the slot extends at least partially into the frame;
wherein the message bar is made from a structural material and has transparent optical apertures formed therethrough; and
wherein the transparent optical apertures form a message.

2. The frame of claim 1 further including a colored tint mask positioned between the transparent optical apertures and the light source.

3. The frame of claim 1 wherein the light source is at least one light emitting diode electrically connected to a battery.

4. The frame of claim 3 wherein the light source has a connector for attachment to a headlight circuit.

5. The frame of claim 1 wherein the frame and the at least one message bar are metallic.

6. The frame of claim 1 wherein the frame and the at least one message bar are made of chromed aluminum.

7. The frame of claim 1 wherein the at least one message bar is removably fastened to the frame.

8. The frame of claim 7 further including at least one removable fastener connecting the at least one message bar to the frame.

9. The frame of claim 8 wherein the recess further comprises at least one aperture, the at least one message bar further comprises at least one internally threaded recess, wherein the at least one removable fastener is an at least one externally threaded screw, and wherein the at least one externally threaded screw extends through the at least one aperture and into the at least one internally threaded recess to threadedly secure the message bar in the slot.

10. The frame of claim 1 wherein the frame further comprises a mounting member suitable for attaching said frame to a motorcycle.

11. The frame of claim 1 wherein the frame further comprises a mounting member suitable for attaching said frame to an automobile.

12. The frame of claim 1 wherein the at least one message bar comprises a plurality of individual message bars, wherein each individual message bar displays a message, and wherein the messages are substantially different.

13. A motorcycle license plate frame comprising:

a frame made from a structural material a substantially horizontal slot formed in the frame;

a light source operationally connected within the slot; and at least one message bar having a form adapted to fit into the slot;

wherein the slot extends at least partially through the frame;

wherein the frame and the message bar are chromed;

wherein the message bar is made from a structural material and has transparent optical apertures formed therethrough; and wherein the transparent optical apertures form a message.

14. A vehicular license plate holder system, comprising:

a frame made from a structural material and having a height and width adapted to outline a license plate;

an elongated cavity formed in the frame;

at least one light source disposed within the elongated cavity having a connector for attachment to a vehicle's electrical system; and a substantially opaque elongated message bar having a form adapted to rest in the elongated cavity;

wherein the elongated message bar is made from a structural material and includes shaped transparent optical apertures formed therethrough; and wherein the shaped transparent optical apertures are organized to display a desired message.

15. The system of claim 14 wherein the shaped transparent optical apertures are windows within the message bar providing an unrestricted flow of gaseous matter therethrough.

16. The system of claim 15 wherein the windows have a transparent covering, said covering restricting the flow of liquid and gaseous matter through the shaped transparent optical apertures.

17. The system of claim 16 wherein the covering is a tinted non-opaque member.

18. The system of claim 14 wherein the frame and the elongated message bar are substantially formed from chromed metal.

19. A method of displaying an illuminated message from a motorcycle, comprising the steps of:

a) providing a license plate frame made from a structural material and having an elongated recess formed therein;

b) positioning a light source in the recess;

c) providing at least one elongated substantially opaque message bar made from a structural material having windows formed therein for displaying a predetermined message; and d) removably connecting the at least one elongated message bar in the elongated recess.

20. The method of claim 19 further comprising the step of:

e) energizing the light source.

* * * * *